Patented May 3, 1938

2,115,739

UNITED STATES PATENT OFFICE 2,115,739

PROCESS OF MAKING RED PIGMENTS

Kenneth S. Mowlds, Baltimore, Md., assignor to The Glidden Company, Cleveland, Ohio, a corporation of Ohio No Drawing. Application June 1, 1934, Serial No. 728,539

4 Claims. (Cl. 134—58)

This invention relates to the cadmium selenium reds, and has particular reference to a new and novel method of producing these pigments, whereby cleaner and more intense red shades may be produced in an economical manner, with minimum loss of selenium.

The cadmium selenium reds are essentially cadmium sulfo-selenides. While the sulfide of cadmium is yellow, and the selenide dark brown to black, the sulfo-selenide may be varied from a light orange to a rich maroon shade, if conditions of manufacture are carefully regulated. Several methods of manufacture have been suggested. I prefer to use the method outlined in the O'Brien Patent #1,894,931, granted Jan. 17, 1933; my improved process, however, is applicable to cadmium sulfo-selenide or cadmium red lithopone no matter how prepared.

Selenium metal is preferably dissolved in barium or sodium sulfide liquor, in an amount depending on the shade of red desired (as described in the O'Brien patent). The solution is then added to a cadmium sulfate solution; the strike conditions may be reversed if desired, or the two solutions may be run into a strike tank simultaneously. The precipitate will be cadmium sulfo-selenide, with or without barium sulfate; and a slurry of pigment is obtained. It is ordinarily filtered, washed, and calcined in a muffle at 550–700° C. for ¼ to 1 hour.

I have discovered that improved color, as to depth and cleanness, and reduced loss of selenium can be obtained, by heating the strike slurry, or the filtered and washed pigment, under pressure, at temperatures ranging from 115° C.–450° C., and at pressures from 1,000–40,000 pounds per square inch, for periods from 1–96 hours. The improvement I attribute to the combination of free selenium with the pigment, whereby the color deepens and brightens.

Metallic selenium may be added to the strike slurry just before the pressure heating, but the dispersion of the selenium through the mass is much less uniform than in the case where the selenium is dissolved in the sulfide liquor; because of this difficulty, I of course prefer to add all of the selenium to the sulfide solution.

As an example of my invention, I dissolve 200 pounds of selenium in 500 gallons of a 17° Baumé barium sulfide solution (containing approximately 200 grams BaS per liter). The clarified solution is run into 266 gallons of a cadmium sulfate solution (containing about 1,475 pounds CdSO₄); the struck pulp is adjusted to a final pH of about 7.2–8.5, and the pigment settled into a slurry. The slurry is then run into an autoclave, and heated at app. 185° C. and two thousand pounds per square inch pressure for thirty-six hours. During this treatment, the free selenium present tends to combine with the pigment to increase the depth of shade. The slurry is filtered after cooling and discharging, washed and calcined in a conventional manner.

A pigment prepared in the above manner is of a bright deep maroon shade; while the same pigment, without the autoclaving step, is of rather a duller dark red color, neither as bright nor as deep as the autoclaved product.

While I have indicated in the above example a lithopone type pigment of a definite color, prepared over a definite process, the autoclaving action is generic for all cadmium sulfo-selenide pigments, no matter how prepared.

The autoclaving should preferably be conducted on the wet slurry; but a dry or moist filter-cake may be used if desired.

The time and temperature-pressure of treatment may be varied widely; the temperature and pressure, of course, are mutually interdependent (according to van der Waal's equation). While I prefer to work under the conditions indicated in the example, higher or lower temperatures and pressures may be used; I prefer to avoid the higher temperatures, because of the danger of bursting the autoclave, and the cost of high-pressure equipment; the lower temperatures give a slower rate of reaction. The time will, of course, depend on the color desired, at any temperature-pressure; however, a point is reached where the reaction is substantially complete. For 250° C. and 15,000 pounds pressure, this is 92 hours.

Calcination after the pressure treatment is preferred, but is not essential in all cases.

My process makes possible the production of a deeper shade of cadmium red than it has heretofore been possible to produce. In addition, it is possible to produce any color by the use of less selenium, as the free selenium which was formerly lost by volitalization during the calcination step is combined prior to it, and remains with the pigment.

I claim:

1. The step in the process of preparing a cadmium sulfo-selenide pigment, which comprises heating a crude cadmium sulfo-selenide pigment containing free selenium at 115° to 450° C. and 1,000 to 40,000 pounds per square inch pressure.

2. The step in the process of preparing a cadmium sulfo-selenide pigment, which comprises heating a crude cadmium sulfo-selenide pigment containing free selenium at 115° to 450° C. and 1,000 to 40,000 pounds per square inch pressure until the free selenium is combined with the pigment.

3. The step in the process of preparing a cadmium sulfo-selenide pigment, which comprises heating a slurry of a crude cadmium sulfo-selenide pigment containing free selenium at 115° to 450° C. and 1,000 to 40,000 pounds per square inch pressure.

4. The step in the process of preparing a cadmium sulfo-selenide pigment, which comprises heating a slurry of a crude cadmium sulfo-selenide pigment containing free selenium at 115° to 450° C. and 1,000 to 40,000 pounds per square inch pressure until the free selenium is combined with the pigment.

KENNETH S. MOWLDS.